(No Model.)
D. W. PETERS.
DEVICE FOR SCALDING HOGS.
No. 306,031.  Patented Sept. 30, 1884.
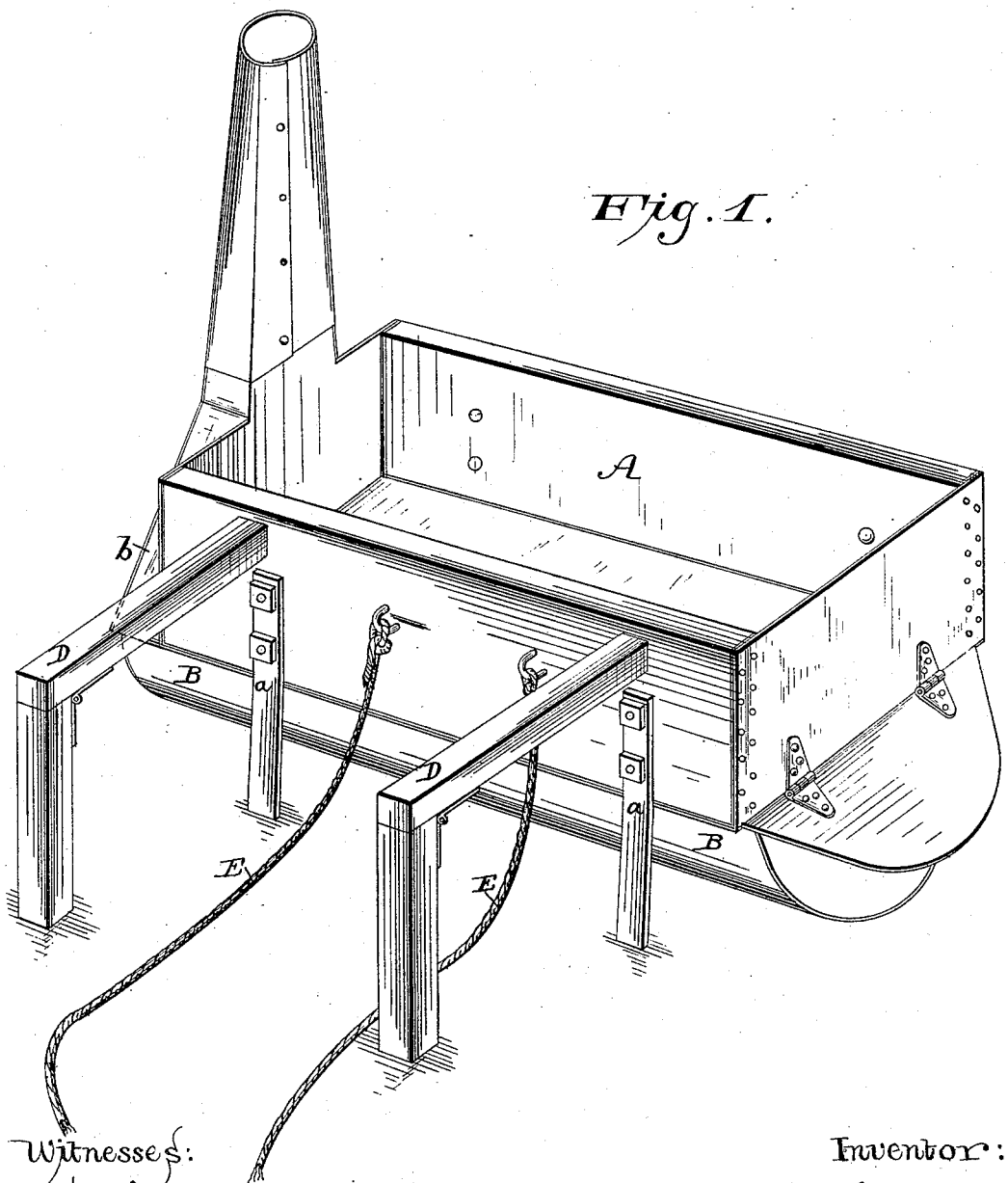

(No Model.) 2 Sheets—Sheet 2.
D. W. PETERS.
DEVICE FOR SCALDING HOGS.
No. 306,031. Patented Sept. 30, 1884.
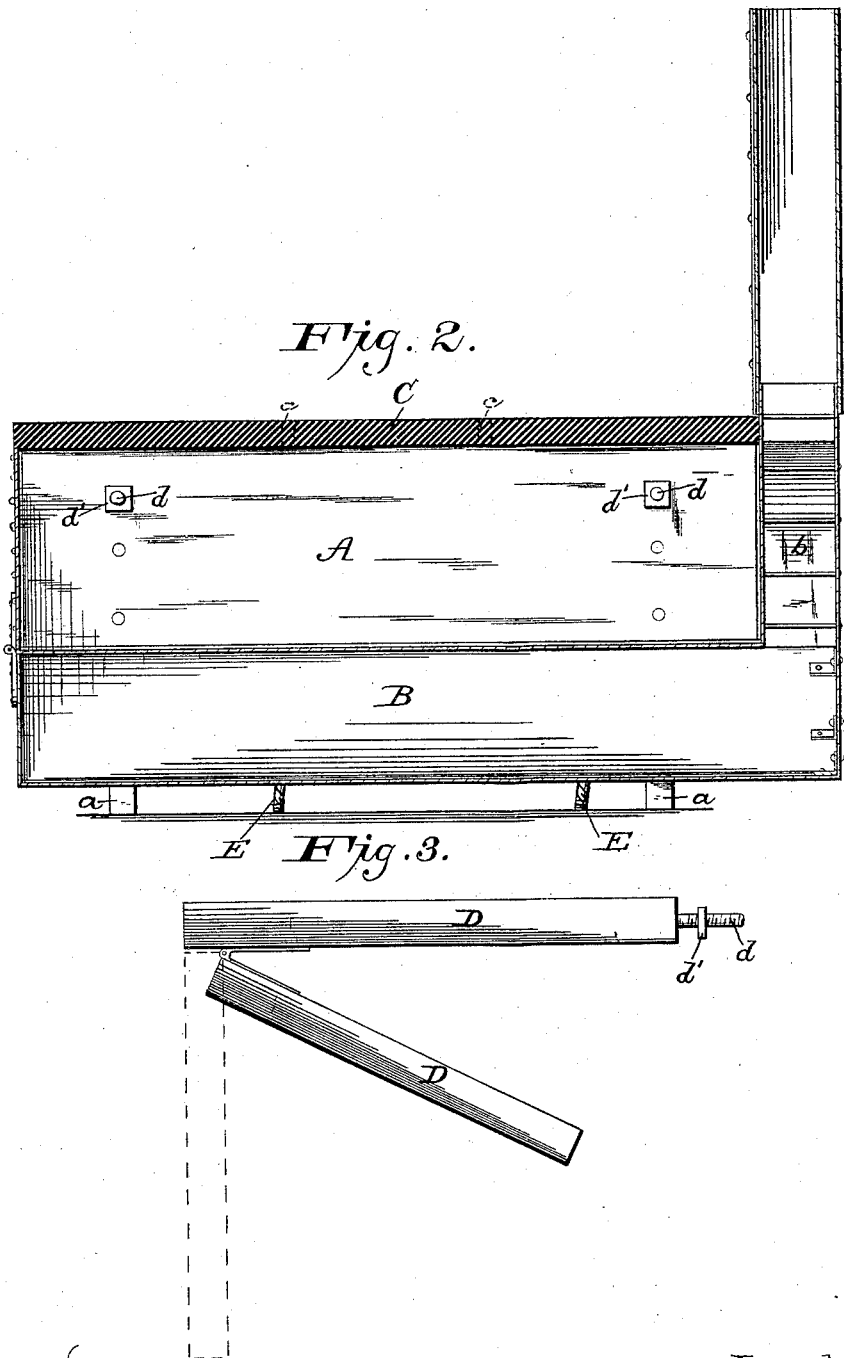

United States Patent Office.

DAVID W. PETERS, OF DAKOTA, ASSIGNOR OF ONE-HALF TO ALVIN C. BROWN, OF WINONA COUNTY, MINNESOTA.

DEVICE FOR SCALDING HOGS.

SPECIFICATION forming part of Letters Patent No. 306,031, dated September 30, 1884.

Application filed January 19, 1884. (No model.)

*To all whom it may concern:*

Be it known that I, DAVID W. PETERS, a citizen of the United States, residing at Dakota, in the county of Winona and State of Minnesota, have invented certain new and useful Improvements in Devices for Scalding Hogs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to agricultural boilers designed for the scalding of hogs and the cooking of feed for stock, and its object is to effect certain economies of construction and operation, as hereinafter described.

In the accompanying drawings, wherein like letters represent like parts, Figure 1 is a side and rear perspective view of my boiler with the dresser-supports attached. Fig. 2 is a sectional view of my boiler taken lengthwise through the middle, and Fig. 3 is a detached view of the dresser supports or brackets.

A is a boiler, the two sides of which are of wood and secured to the metal ends and bottom by nails, screws, or bolts, the joints being calked with cotton fabric and white lead to make them steam and water tight, or packed in any other familiar manner, no claim to novelty being made upon the manner of packing these joints.

B is a sheet-metal furnace, half-cylindrical in shape and running the whole length of the bottom of the boiler, and projecting beyond it at the end to form a draft-chamber, $b$, terminating in a smoke-funnel of ordinary construction. The furnace closes with an ordinary drop-door. Legs $a\ a$ support the boiler and furnace.

C is a detachable lid, resting upon and covering the upper edges of the walls of the boiler during the operation of cooking or scalding. When this operation is completed, the lid is removed, the bolts $d\ d$ are put through holes pierced in one of the side walls near its upper edge, and these bolts are secured by the nuts $d'\ d'$, which are screwed on the bolt ends projecting through the boiler-wall internally. By means of these screw-bolts the brackets D D are attached firmly to the side of the boiler, and the loose lid C can then be laid upon them, so as to serve as a platform or dresser during the removal or further treatment of the cooked or scalded material.

When a hog is to be scalded in the boiler, the ropes or chains E E come into use. One end of each rope is permanently attached to the outside of that wall to which the brackets are made adjustable, and on a lower plane than the brackets, and the ropes are then laid across the bottom of the boiler internally, so as to be beneath the carcass, their free ends being then brought around the carcass and left hanging outside the boiler on the same side as that from which they start. When the carcass is scalded, the lid is removed, the brackets bolted in place, the lid set upon them, so as to form a side platform to the boiler, upon which the operator mounts, and, taking the ropes in his two hands, respectively, he is enabled by pulling upon them to lift the carcass from the boiler and turn it out upon the lid ready for scraping, and without assistance, as is usual where the boiler has not the elevated side platform and hoisting-ropes. Notches $c\ c$ are formed in one edge of the lid to receive the ropes when the lid is serving as a platform, so that the ropes shall not spread and release the carcass during the hoisting thereof from the scalding water.

For convenience of stowage, the funnel and the brackets D may be packed inside the boiler when not in use, the funnel being made detachable and the brackets having hinges at the angle, so that they may be folded.

Having thus described my invention, what I claim to be new and useful, and desire to secure by Letters Patent, is the following:

The combination, in a hog-scalder, of the lid C, having the notches $c$, with the brackets D, having the bolts $d$ and the nuts $d'$, the ropes E, and the boiler A, in the manner hereinbefore described, whereby the scalded carcass is safely and conveniently removed from the boiler, as hereinbefore set forth.

In testimony whereof I affix my signature in presence of two witnesses.

DAVID W. PETERS.

Witnesses:
J. M. SHEARDOWN,
CHESTER HOLDING.